United States Patent
Aoki et al.

(10) Patent No.: US 7,446,439 B2
(45) Date of Patent: Nov. 4, 2008

(54) LINEAR MOTOR ARMATURE AND LINEAR MOTOR USING THE SAME

(75) Inventors: Teruhiko Aoki, Fukuoka (JP); Jianping Yu, Fukuoka (JP)

(73) Assignee: Kabushiki Kaisha Yaskawa Denki, Fukuoka (JP)

(*) Notice: Subject to any disclaimer, the term of this patent is extended or adjusted under 35 U.S.C. 154(b) by 552 days.

(21) Appl. No.: 10/557,411

(22) PCT Filed: May 13, 2004

(86) PCT No.: PCT/JP2004/006446
§ 371 (c)(1),
(2), (4) Date: Nov. 18, 2005

(87) PCT Pub. No.: WO2004/105219
PCT Pub. Date: Dec. 2, 2004

(65) Prior Publication Data
US 2007/0040453 A1 Feb. 22, 2007

(30) Foreign Application Priority Data
May 20, 2003 (JP) ............................ 2003-141389

(51) Int. Cl.
*H02K 41/02* (2006.01)
(52) U.S. Cl. ............................ 310/12; 355/72; 355/53
(58) Field of Classification Search ............ 310/12; 355/72, 53
See application file for complete search history.

(56) References Cited

U.S. PATENT DOCUMENTS

| 5,300,846 | A | * | 4/1994 | Miller ........................ 310/12 |
| 2008/0157607 | A1 | * | 7/2008 | Scheich et al. ............. 310/12 |

FOREIGN PATENT DOCUMENTS

| JP | 2000-175434 A | 6/2000 |
| JP | 2001-25227 A | 1/2001 |
| JP | 2001-231246 A | 8/2001 |
| JP | 2002-27730 A | 1/2002 |
| JP | 2002-272087 A | 9/2002 |

* cited by examiner

*Primary Examiner*—Gary F. Paumen
(74) *Attorney, Agent, or Firm*—Sughrue Mion, PLLC

(57) ABSTRACT

It is an object to provide a linear motor armature which can simplify the motor structure and reduce the size while reducing the deformations of the board, the can and the frame, and a linear motor using that armature. The linear motor armature comprises an armature coil (11) fixed on the two side faces of a board (12), and a sealed body including a can (2) and a frame (3) and disposed to cover the armature coil (11), and a coolant is fed around the armature coil (11) to cool the same. The armature coil (11) is adhered and fixed to the board (12) and is assembled with the frame (3). After this, a brace (9) is arranged between the can (2) and the frame (3), and the can (2) and the brace (9), and the frame (3) and the brace (9) are individually jointed to each other by welding them.

3 Claims, 4 Drawing Sheets

LINEAR MOTOR ARMATURE AND LINEAR MOTOR USING THE SAME

TECHNICAL FIELD

The present invention relates to a linear motor armature to be used, for example, in a semiconductor exposure device, a liquid-crystal exposure device or the like, as demanded to have a low temperature rise, and a linear motor using the armature.

RELATED ART

In the prior art, a higher speed and a higher output have been demanded year after year by a high-precision positioning device such as the semiconductor exposure device or the liquid-crystal exposure device. For this high performance of the high-precision positioning device, a low temperature rise is demanded by the linear motor or the component of that device. This linear motor is constructed, for example, as shown in FIG. 4. The following description is made by taking up a voice coil type for driving a stage device.

FIG. 4 is a perspective view showing the entire appearance common to the linear motors of the prior art. Numeral 1 designates an armature, numeral 2 a can, numeral 3 a frame, numeral 4 a coolant outlet, numeral 5 permanent magnets, numeral 6 a yoke, numeral 7 a base, numeral 8 a field system, and numeral 10 a coolant inlet. On the other hand, FIG. 5 is an exploded perspective view of an armature of the first prior art.

In FIG. 4, the linear motor is composed of the armature 1 as a moving element and the field system 8 as a stator. At the same time, the armature 1 moves the moving element in the directions, as indicated by arrows, while being supported by the not-shown linear guide, air slider or slide guide.

Specifically, the field system 8 is constructed to include: the yoke 6 of a flat plate shape; the permanent magnets 5 arranged so adjacent to each other as to have the different polarities alternately; and the base 7 for mounting the yoke 6. The permanent magnets 5 are fixed by adhering them to the yoke 6 and are arranged through a gap on the two sides of the later-described armature 1.

As shown in FIG. 5, on the other hand, the armature 1 is constructed to include: the armature coil 11 shaped by winding a copper wire concentratedly; the board 12 for arranging and fixing the armature coil 11 in position; the frame 3 for fixing the four corners of the board 12 with the screws 13; and the can 2 for covering and sealing the outer side of the armature coil 11, as fixed on the two side faces of the board 12, in the frame 3. Here, the can 2 is basically made of a non-magnetic material such as a sheet of stainless steel, a resin or ceramics. Moreover, the frame 3 is cast of stainless steel and is holed at its central portion to have a hole portion 3A for housing the armature coil 11 and the board 12. The portion (i.e., the bottom portion), as opposed to the can 2, of the hole portion 3A is given a thickness corresponding to that of the can 2. Moreover, the frame 3 is provided, at one end and at the other end in the longitudinal direction, with the coolant inlet 10 and the coolant outlet 4, respectively, for passing a coolant therethrough. The can 2 is jointed by welding its joint face to the frame 3 so that the can 2 and the frame 3 construct a sealed body. Moreover, the board 2 is frequently made of stainless steel because it is demanded to have its own strength.

Moreover, FIG. 6 is a front elevation of the armature of FIG. 5, and FIG. 7 is a sectional view along line A-A of FIG. 6. In these Figures, numeral 14 designates a coolant passage.

In order to reduce the temperature rise of the armature coil 11, as shown in FIG. 6 and FIG. 7, the motor is provided therein with the coolant passage 14. The coolant is caused to flow through the coolant passage 14 between the armature coil 11 and the can 2 by feeding it from the coolant inlet 10 and discharging it from the coolant outlet 4.

In the linear motor thus constructed, when a predetermined current matching the position of the moving element is fed to the armature coil 11, the moving element acts with the magnetic field generated by the permanent magnets 5 of the stator thereby to establish a thrust. Then, the armature coil 11 heats up to a high temperature due to the copper loss. The heat of the armature coil 11 is recovered by the coolant, but the heat unrecovered raises the temperature of the frame 3. The raised temperature value of the board 12 is substantially equal to that of the armature coil 11 because it has a small portion to contact with the coolant. As a result, a temperature difference occurs between the frame 3 and the board 12 (as referred to Patent Publication 1, for example).

Here is described a second prior art.

FIG. 8 is an exploded perspective view of an armature according to the second prior art; FIG. 9 is a front elevation of the armature shown in FIG. 8; and FIG. 10 is a sectional view along line A-A of FIG. 9. The description of the second prior art is made only on components different from those of the first prior art while omitting the common components.

Specifically, the difference exists in that O-rings 17 are sandwiched between a brace 18 and the can 2 and between the brace 18 and the frame 3 so as to prevent the leakage of the coolant, and in that the can 2, the frame 3 and the board 12 are holed at their centers thereby to fix the board 12 from the side of the can 2 and the frame 3 with a counter-sunk screw 16. This construction makes a structure to reduce the deformations of the can 2 and the frame 3, which might otherwise be caused by the pressure of the coolant fed. Here are omitted the actions of the linear motor, because they are similar to those of the first prior art (as referred to Patent Publication 2, for example).

Patent Publication 1:
JP-A-2001-25227 (Page 2 and FIG. 4 of the Specification); and Patent Publication 2:
JP-A-2001-231246 (Page 4 and FIG. 2 of the Specification).

DISCLOSURE OF THE INVENTION

Problems to be Solved by the Invention

However, the prior art has the following problems.

(1) In the first prior art, a thermal stress might occur to deform the board 12, because the thermal expansion of the temperature-raised board 12 and the thermal expansion of the frame 3 were different.

(2) The second prior art had many parts and a complicated structure, because they contemplated to reduce the deformations of the can 2 and the frame 3 by using the O-rings 17 and the counter-sunk screw 16. The prior art had such restrictions that sealing faces were required for the O-rings 17 and that an area of some extent was required for the diametrical size of the brace 18. The can 2 required a thickness for sinking the screw head thereby to obstruct the size reduction of the motor.

The present invention has been achieved to solve the aforementioned problems and has an object to provide a linear motor armature which can simplify the motor structure and reduce the size while reducing the deformations of the board, the can and the frame, and a linear motor using that armature.

Means for Solving the Problems

In order to solve the aforementioned problems, according to the invention of claim 1, there is provided a linear motor armature including: an armature coil fixed on the two side faces of a board, and a sealed body including a can and a frame and disposed to cover the armature coil, to feed a coolant around the armature coil to cool the same, wherein a brace is so disposed between the can and the frame opposed to each other as to reduce the deformations of the can and the frame caused by the pressure of the coolant, and the brace is jointed by welding.

In the linear motor armature as set forth in claim 1, according to the invention of claim 2, at least one groove is formed in the board perpendicularly of the longitudinal direction.

The invention of claim 3 relates to a linear motor including: the linear motor armature as set forth in claim 1 or 2, and a field system arranged to confront the armature through a gap, wherein the field system includes: a yoke and a plurality of permanent magnets so arranged adjacent to each other on the yoke as to have different polarities alternately, and one of the armature and the field system is a relatively movable moving element, and the other is a stator.

Effect of the Invention

According to the invention, the following effects are acquired.

(1) In the linear motor armature according to the first embodiment, the brace is disposed between the can and the frame opposed to each other, so as to reduce the deformations, as might otherwise be caused by the pressure of the coolant, of the can and the frame, and the brace is jointed by welding it. Unlike the prior art, the can and the frame are not reduced due to the deformations but kept in the reductions. Moreover, the O-rings and the counter-sunk screw used in the prior art can be dispensed with to reduce the parts number and to simplify the assembly. Still moreover, the thickness, as required for sinking the head of the counter-sunk screw in the prior art, of the can is capable to be eliminated to make the can thinner. Furthermore, the fastening by the counter-sunk screw can be eliminated to thin the brace thereby to realize the size reduction and the high thrust of the motor.

(2) The linear motor armature according to the second embodiment is provided with grooves in the board perpendicularly of the longitudinal direction. As a result, the thermal stress, if occurs in the board, can be relaxed by the extension/contraction of the portions of the grooves thereby to reduce the deformation.

BEST MODE FOR CARRYING OUT THE INVENTION

Embodiments of the invention are specifically described in the following with reference to the accompanying drawings.

EMBODIMENT 1

FIG. 1 is a front elevation of an armature of a linear motor and shows a first embodiment of the invention. FIG. 2 is a sectional view along lien B-B of FIG. 1. The description of the invention is made only on components different from those of the prior art while omitting the common components.

Specifically, the difference exists in that an armature coil 11 is adhered and fixed on a board 12 and is assembled with a frame 3, in that a brace 9 is then arranged between a can 2 and the frame 3 opposed to each other, and in that the can 2 and the brace 9, and the frame 3 and the brace 9 are jointed by welding them individually. Here is omitted the description of the actions of the linear motor because they are identical to those of the prior art.

In the linear motor armature according to the first embodiment, the brace 9 is disposed between the can 2 and the frame 3 opposed to each other, and the brace 9 is jointed by welding it, so as to reduce the deformations, as might otherwise be caused by the pressure of the coolant, of the can 2 and the frame 3. Unlike the prior art, the can 2 and the frame 3 are not reduced due to the deformations but kept in the reductions. Moreover, the O-rings 17 and the counter-sunk screw 16 used in the prior art can be dispensed with to reduce the parts number and to simplify the assembly. Still moreover, the thickness, as required for sinking the head of the counter-sunk screw 16 in the prior art, of the can 2 can be eliminated to make the can 2 thinner. Furthermore, the fastening by the counter-sunk screw can be eliminated to thin the brace 9 thereby to realize the size reduction and the high thrust of the motor.

EMBODIMENT 2

FIG. 3 is a front elevation of a board to be used in an armature of a linear motor and shows a second embodiment of the invention.

In the Figure, two grooves 2A are formed in the board 12 perpendicularly of the longitudinal direction.

Thus in the second embodiment, the grooves 12A are formed in the board 12 perpendicularly of the longitudinal direction. As a result, the thermal stress, if occurs in the board 12, can be relaxed by the extension/contraction of the portions of the grooves 12A thereby to reduce the deformation.

INDUSTRIAL APPLICABILITY

The present invention is useful in the field of providing a canned linear motor demanded to have a low temperature rise, when it is applied to the linear motor armature to be used, for example, in the semiconductor exposure device, the liquid-crystal exposure device or the like, and to the linear motor using the armature.

DESCRIPTION OF REFERENCE NUMERALS AND SIGNS

Figure 1:
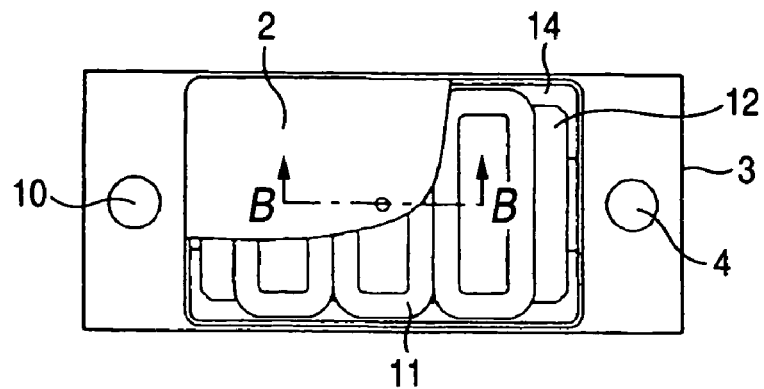
[FIG. 1] A front elevation of an armature of a linear motor and shows a first embodiment of the invention.
Figure 2:
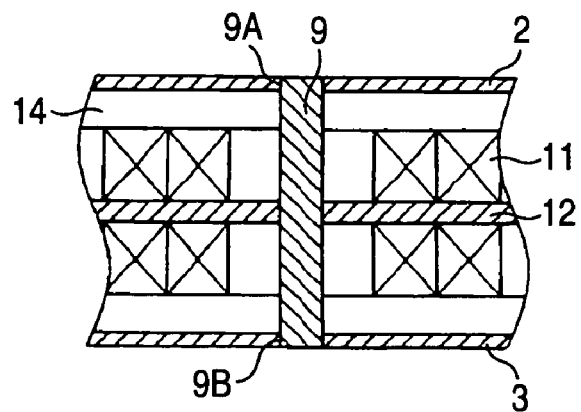
[FIG. 2] A sectional view along line B-B of FIG. 1.
Figure 3:
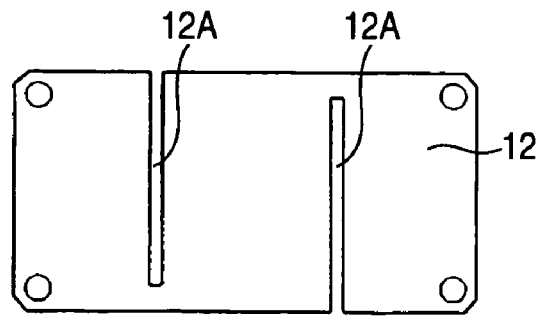
[FIG. 3] A front elevation of a board to be used in an armature of a linear motor and shows a second embodiment of the invention.
Figure 4:
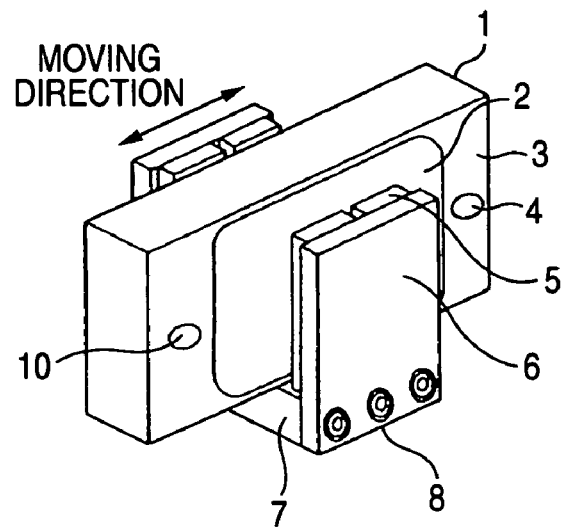
[FIG. 4] A perspective view showing the entire appearance common to the linear motors of the prior art.
Figure 5:
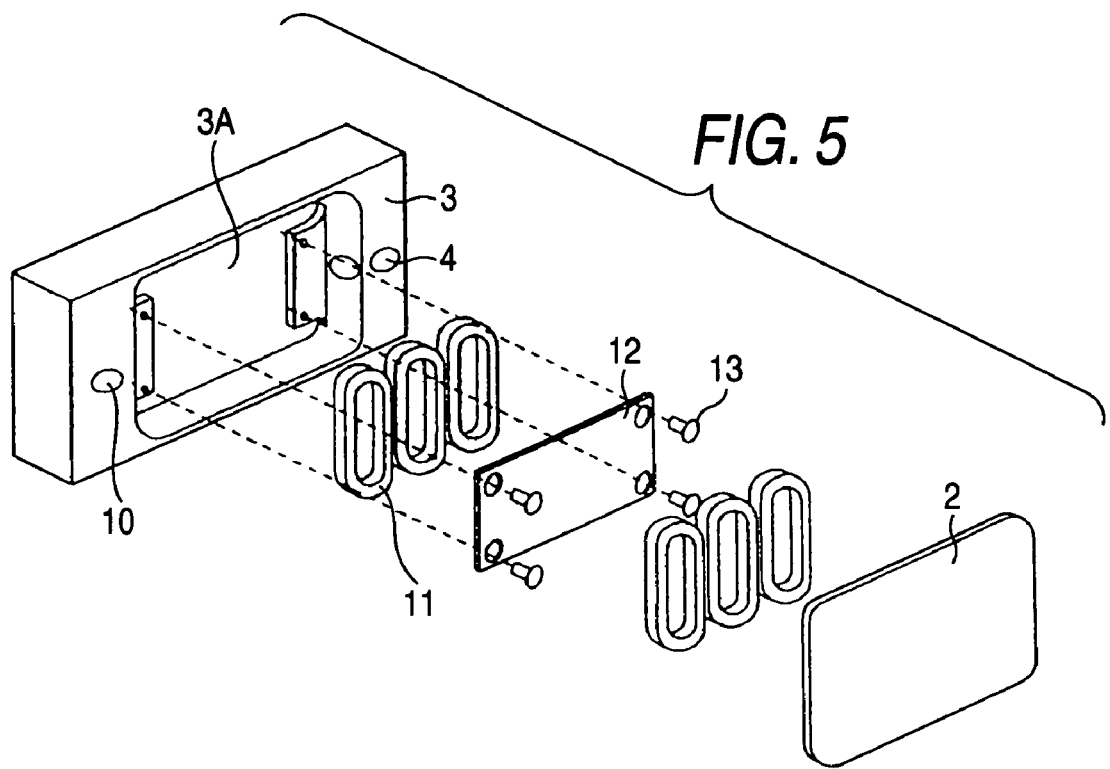
[FIG. 5] An exploded perspective view of an armature a first prior art.
Figure 6:
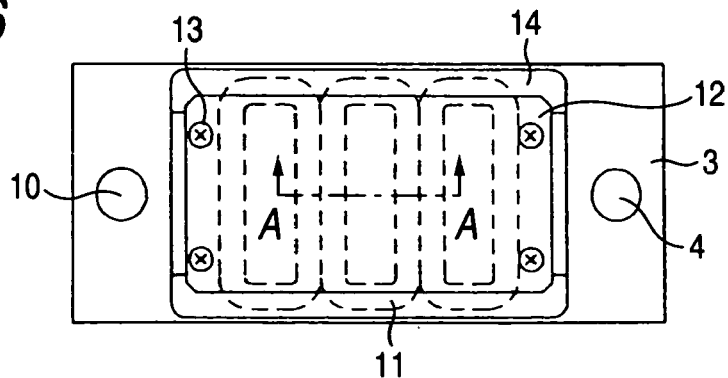
[FIG. 6] A front elevation of the armature of FIG. 5.
Figure 7:
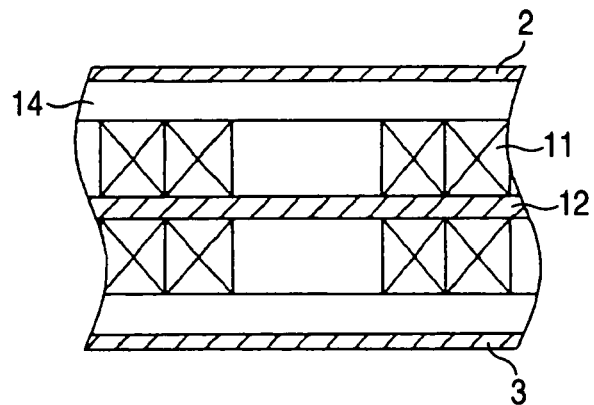
[FIG. 7] A sectional view along line A-A of FIG. 6.
Figure 8:
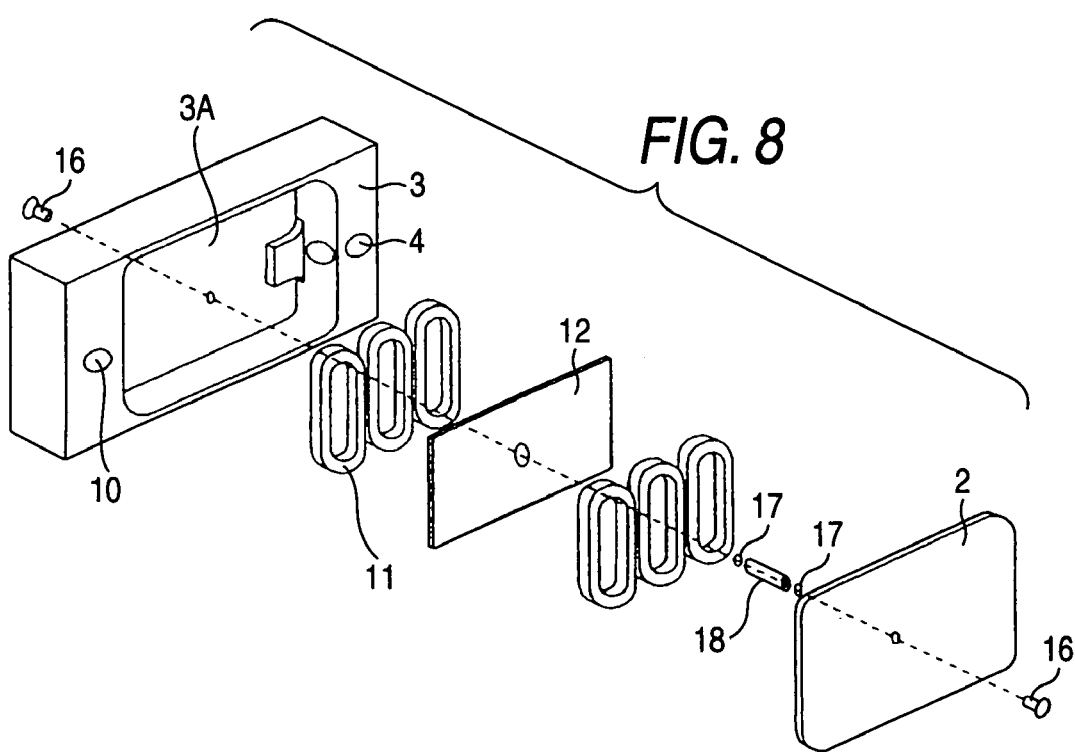
[FIG. 8] An exploded perspective view of an armature according to a second prior art.
Figure 9:
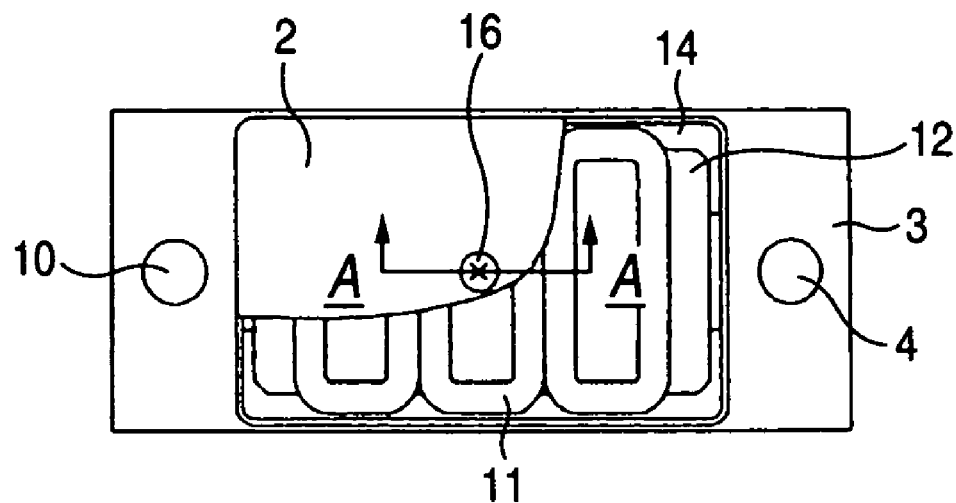
[FIG. 9] A front elevation of the armature shown in FIG. 8.
Figure 10:
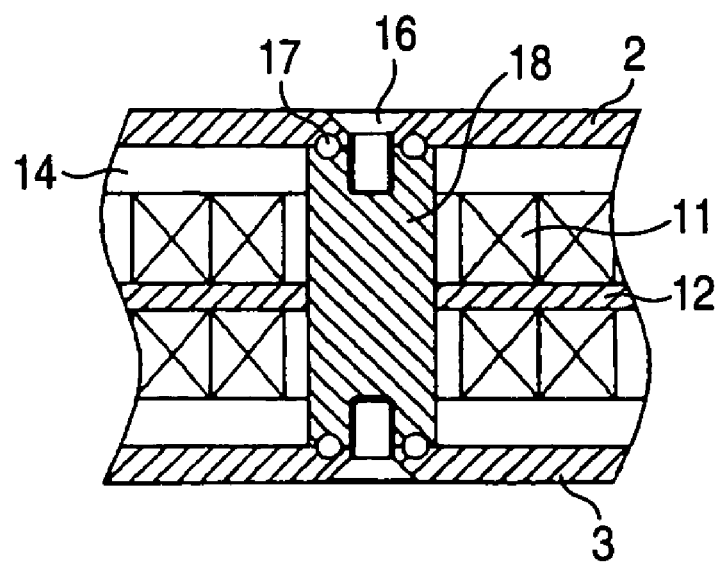
[FIG. 10] A sectional view along line A-A of FIG. 9.

1 Armature
2 Can
2A Groove
3 Frame
3A Hole Portion
4 Coolant Outlet
5 Permanent Magnets
6 Yoke
7 Base
8 Field System
9 Brace
9A, 9B Joint Face
10 Coolant Inlet
11 Armature Coil
12 Board
13 Screw
14 Coolant Passage
16 Counter-Sunk Screw
17 O-Rings
18 Brace

The invention claimed is:

1. A linear motor armature comprising:
an armature coil fixed on the two side faces of a board, and
a sealed body including a can and a frame and disposed to cover the armature coil, to feed a coolant around the armature coil to cool the same, wherein
a brace is so disposed between the can and the frame opposed to each other as to reduce the deformations of the can and the frame caused by the pressure of the coolant, and
the brace is jointed by welding.

2. The linear motor armature as set forth in claim 1, wherein at least one groove is formed in the board perpendicularly of the longitudinal direction.

3. The linear motor comprising:
the linear motor armature as set forth in claim 1, and
a field system arranged to confront the armature through a gap, wherein
the field system includes: a yoke and a plurality of permanent magnets so arranged adjacent to each other on the yoke as to have different polarities alternately, and
one of the armature and the field system is a relatively movable moving element, and the other is a stator.

* * * * *